(12) United States Patent
Ikeda et al.

(10) Patent No.: US 6,335,389 B1
(45) Date of Patent: Jan. 1, 2002

(54) RESIN COMPOSITIONS FOR POWDERY COATINGS

(75) Inventors: Hisao Ikeda; Motohiko Hidaka, both of Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/600,892

(22) PCT Filed: Feb. 12, 1999

(86) PCT No.: PCT/JP99/00592

§ 371 Date: Aug. 16, 2000

§ 102(e) Date: Aug. 16, 2000

(87) PCT Pub. No.: WO99/41318

PCT Pub. Date: Aug. 19, 1999

(30) Foreign Application Priority Data

Feb. 17, 1998 (JP) .............................. 10-034592

(51) Int. Cl.⁷ .............................. C08K 5/34; C08K 5/15
(52) U.S. Cl. ................. 524/99; 524/100; 524/101; 524/102; 524/109
(58) Field of Search .................. 524/99, 100, 101, 524/102, 109

(56) References Cited

U.S. PATENT DOCUMENTS

| | | | |
|---|---|---|---|
| 3,620,983 A | 11/1971 | Porret et al. | |
| 5,097,006 A | 3/1992 | Kapilow et al. | |
| 6,114,473 A | * 9/2000 | Miyake et al. | ............ 525/438 |

FOREIGN PATENT DOCUMENTS

| | | |
|---|---|---|
| EP | 0 816 442 | 1/1998 |
| EP | 816442 | * 1/1998 |
| JP | 54-88935 | 7/1979 |
| JP | 6-128409 | 5/1994 |
| JP | 8-325481 | 12/1996 |

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

A resin composition for powdery coatings, which contains the following components (A), (B) and (C):

(A) a carboxyl group-containing resin having a number average molecular weight of from 1000 to 20000, an acid value of from 5 to 200 and a glass transition temperature of from 30 to 120° C., (B) a poly-β-methylglycidyl compound having at least two structures represented by the formula (1) in one molecule:

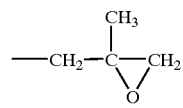

formula (1)

and (C) a sterically-hindered amine as a heat yellowing inhibitor.

19 Claims, No Drawings

RESIN COMPOSITIONS FOR POWDERY COATINGS

TECHNICAL FIELD

The present invention relates to a resin composition for powdery coatings, which utilizes a carboxyl group-containing resin and a curing agent having a β-methylglycidyl group, and which provides coating films having high impact resistance, weather resistance, heat yellowing resistance, etc., useful for outdoor uses.

BACKGROUND ART

As resins for powdery coatings, e.g. epoxy resins, polyester resins, polyacrylic resins, polyvinyl chloride resins and polyethylene resins are used at the present time.

In recent years, thermosetting resins are mainly used from the viewpoint of physical properties and smoothness of the coating films. However, thermosetting resins have a drawback such that in a case of using a condensation resin or in a case of using a block isocyanate as a curing agent, a condensation desorption component or a blocking agent may gasify to form bubbles in the coating films.

Accordingly, as a preferred curing agent to be used for powdery coatings, a polyglycidyl compound having no desorption component during the curing reaction may be mentioned. However, if a conventional glycidyl compound such as a bisphenol type diglycidyl ether is used as a curing agent, it has been known that the resin may decompose when used outdoors, due to unstableness to light derived from its phenyl ether structure, and the glossiness of the surface will disappear very early. Further, the use of a polyglycidyl compound having a skeleton other than the bisphenol type as a curing agent is imperfect, since a demand for the weather resistance is increasing in recent years. With respect to such a demand, it has been known that a coating film having an excellent weather resistance will be obtained by using as a crosslinking agent a poly-β-methylglycidyl compound instead of the polyglycidyl compound.

As examples of using said poly-β-methylglycidyl compound as a curing agent for powdery coatings, JP-A-49-24244 discloses a resin composition for powdery coatings, which comprises a polyester resin having an acid value of from 30 to 200, synthesized from e.g. an aromatic dicarboxylic acid or its ester, a dihydroxy alcohol and a polyhydric carboxylic acid, and tris(β-methylglycidyl) isocyanurate.

JP-A-49-94722 discloses a method for producing a resin composition for powdery coatings which comprises a free hydroxyl group-containing polyester resin, an acid anhydride and an epoxy compound such as tris(β-methylglycidyl)isocyanurate.

JP-A-50-19832 discloses a method for producing a resin composition for powdery coatings which comprises a polyester resin containing a carboxyl group on its side chain by means of an ester linkage, and an epoxy compound such as tris(β-methylglycidyl)isocyanurate. The composition may contain an additive such as an ultraviolet light absorber or an antioxidant.

JP-A-51-44130 discloses a resin composition for powdery coatings, which comprises a polyester resin having a free phenolic hydroxyl group, and a compound having at least two glycidyl groups and having a melting point of from 30 to 250° C., a monomer radical-copolymerizable with a compound having an epoxy group, or an epoxy compound such as tris(β-methylglycidyl)isocyanurate. To this composition, a tetraalkylammonium salt such as tetrabutylammonium bromide or tetraethylammonium chloride, an imidazole such as imidazole, 2-methyl-4-ethyl-imidazole or 2-methyl-imidazole, a tertiary amine such as triethylenediamine or N-methyl morpholine, or an organic carboxylic acid such as cobalt naphthenate or zinc naphthenate, may be added as a catalyst.

JP-A-51-12823 discloses a composition for powdery coatings, which has a polyhydric carboxylic acid mixed with a polymer comprising a vinyl monomer having a (methyl) glycidyl group, an unsaturated polyester having a (methyl) glycidyl group and another vinyl monomer. To said composition, e.g. an alkali or an amine may be added so as to accelerate the curing reaction.

JP-A-52-69935 discloses a composition for powdery coatings, which has a specific polyester having a low acid value added to a carboxyl group-containing polyester, and triglycidyl isocyanurate or tris(β-methylglycidyl) isocyanurate. Said composition may contain an additive such as an antioxidant.

JP-A-57-51760 discloses a composition for powdery coatings to be used for topcoats for automobiles, obtained by combining an acrylic copolymer comprising an unsaturated monomer having an epoxy group, a carboxyl-terminated crosslinking agent, a supplementary crosslinking agent or a modifying agent and an ultraviolet light deterioration inhibitor.

JP-A-4-63872 discloses a composition for powdery coatings, which contains a carboxyl group-containing resin, and a polyglycidyl compound having from 2 to 6 glycidyl groups in one molecule, obtained by adding an epoxy compound such as tris(β-methylglycidyl)isocyanurate to a polyester oligomer having at least two carboxyl groups in its molecule. Said composition may contain an additive such as an ultraviolet light absorber or an antioxidant.

JP-A-4-288373 discloses a composition for powdery coatings, which comprises a base resin and a curing agent and a curing catalyst as well. The base resin is a resin having at least two carboxyl groups in one molecule. As the curing agent, triglycidyl isocyanurate or a polyglycidyl compound having from 2 to 6 glycidyl groups on the average in one molecule, obtained by adding tris(β-methylglycidyl) isocyanurate to a polyester oligomer having at least two carboxyl groups in one molecule. Said composition may contain an additive such as an ultraviolet light absorber or an antioxidant.

WO-93/04122 discloses a composition comprising a carboxyl group-containing polyester, an epoxy curing agent such as triglycidyl isocyanurate or a methyl-substituted triglycidyl isocyanurate, and a phosphonium salt catalyst. As the resin for powdery coatings, an epoxy resin, a polyester resin, a polyacrylic resin, a polyvinyl chloride resin or a polyethylene resin may, for example, be used at the present time.

U.K. Patent No. 1,266,066 discloses a thermosetting resin composition which comprises a β-methylglycidyl ester compound and an amine or a polycarboxylic acid.

JP-A-49-24244 discloses a technique utilizing as a curing agent which places emphasis mainly on the storage stability of the powder, a polyglycidyl ester and/or poly-β-methylglycidyl ester of an aromatic polyhydric carboxylic acid having a melting point of from 30 to 250° C. and having at least two glycidyl ester groups and/or β-methylglycidyl ester groups in its molecule.

WO-97/44400 discloses a resin composition for powdery coatings, which contains a carboxyl group-containing resin and bis(β-methylglycidyl)terephthalate as a curing agent, as the main components, and a ring-opening polymerization inhibitor for effective curing reaction, and which provides a coating film having an excellent weather resistance.

Conventionally, a baking-curable powdery coating is usually baked in line, and from its nature, its color may turn yellow relative to the adjusted color during baking, i.e. so-called heat yellowing may occur, for reasons such that the temperature distribution in an oven or the baking time is not constant. This heat yellowing will deteriorate the design of the coating film, and accordingly the powdery coating is required not to undergo heat yellowing, i.e. it is required to have an excellent heat yellowing resistance, even if the baking conditions such as the temperature and the time for baking are severe. However, the poly-β-methylglycidyl compound used as a crosslinking agent is known to be poor in view of heat yellowing resistance as compared with a polyglycidyl compound. Conventionally, it is a sterically-hindered phenol that is used for the purpose of decreasing the heat yellowing of a polymer. The heat yellowing will somewhat decrease by using it, however, when the baking is carried out in a gas oven which is conventionally employed for baking of powdery coatings, the sterically-hindered phenol tends to be oxidized by NOX generated in the gas oven, and tends to have a quinone type structure and may develop a color, such being unfavorable. Further, the heat yellowing resistance of a poly-β-methylglycidyl compound type powdery coating will hardly improve by using another antioxidant of e.g. phosphorus type or sulfur type.

As techniques employing such an antioxidant, JP-A-49-24244, JP-A-49-94722, JP-A-50-19832, JP-A-51-44130, JP-A-51-12823, JP-A-52-69935, JP-A-57-51760, JP-A-4-63872 and JP-A-4-288373 may be mentioned. However, in these techniques, an additive which is conventionally used, or an additive such as an ultraviolet light absorber or an antioxidant may be contained, and no attention has been paid to the heat yellowing resistance of any composition during the curing-baking. Accordingly, no satisfactory heat yellowing resistance could be achieved with formulations as described in the above specifications.

DISCLOSURE OF THE INVENTION

The present invention provides a resin composition for powdery coatings, which meets strict requirements for the weather resistance in recent years, which overcome the above-mentioned problem of the heat yellowing thus arisen, and which provides a coating film having an excellent weather resistance and heat yellowing resistance.

The present invention provides a resin composition for powdery coatings, which contains the following components (A), (B) and (C):

(A) a carboxyl group-containing resin having a number average molecular weight of from 1000 to 20000, an acid value of from 5 to 200 and a glass transition temperature of from 30 to 120° C., (B) a poly-β-methylglycidyl compound having at least two structures represented by the formula (1) in one molecule:

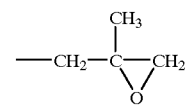

Formula (1)

and (C) a sterically-hindered amine as a heat yellowing inhibitor.

In the resin composition for powdery coatings of the present invention, the poly-β-methylglycidyl compound as the component (B) is preferably β-methylglycidylamide or β-methylglycidyl ester.

In the resin composition for powdery coatings of the present invention, the poly-β-methylglycidyl compound as the component (B) may be bis(β-methylglycidyl)terephthalate, tris(β-methylglycidyl)trimellitate or tris(β-methylglycidyl)isocyanurate.

In the resin composition for powdery coatings of the present invention, the sterically-hindered amine as the component (C) is preferably a compound having a structure having at least one 2,2,6,6-tetramethylpiperidine derivative represented by the formula (2) in its molecule:

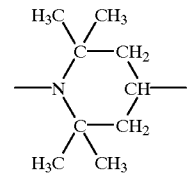

Formula (2)

In the resin composition for powdery coatings of the present invention, the component (A) and the component (B) are contained preferably in an equivalent ratio of (β-methylglycidyl groups in the component (B)) to (carboxyl groups in the component (A)) of from 1.1 to 2.5.

In the resin composition for powdery coatings of the present invention, the component (C) is contained in a proportion of preferably from 0.01 to 10 parts by weight based on 100 parts by weight of the component (A).

In the resin composition for powdery coatings of the present invention, the carboxyl group-containing resin as the component (A) is preferably a polyester resin, a polyacrylic resin or a mixture thereof.

In the present invention, it has been found that the heat yellowing resistance is dramatically improved by adding the above sterically-hindered amine as the component (C) of the present invention to a powdery coating composition. A sterically-hindered amine has conventionally been known as a decomposition inhibitor of high polymers, and its effects have been confirmed against the heat decomposition or the photo decomposition. However, a phenomenon characteristic to an amine, i.e. coloring of a reaction product of an amine such as an oxide, has been known, and the amine usually stains a high polymer by heat, and it has not been known that the amine improves the heat yellowing resistance.

In the present invention, by using a carboxyl group-containing resin as the component (A) and a compound having a β-methylglycidyl group as the component (B), a cured product having an excellent weather resistance can be obtained by the effect of the methyl group located at β-position which increases the hydrolytic resistance.

Further, with respect to the heat yellowing characteristic to a compound having a β-methylglycidyl group, it has been found that the use of a sterically-hindered amine as the component (C) dramatically increases the heat yellowing resistance.

The resin composition for powdery coatings of the present invention can be widely applied to indoor and outdoor use such as home appliances and outer walls, utilizing such characteristics.

BEST MODE FOR CARRYING OUT THE INVENTION

The resin containing a carboxyl group to be used in the present invention as the component (A) has a number average molecular weight of from 1000 to 20000, preferably from 2000 to 10000, an acid value of from 5 to 200 (KOH-mg/g), preferably from 20 to 100 (KOH-mg/g), and a glass transition temperature of from 30 to 120° C., preferably from 40 to 80° C. In the present invention, any carboxyl group-containing resin obtained by using a known material by a known method may be used so long as these conditions are satisfied. Particularly, as such a carboxyl group-containing resin as mentioned above, it is preferred to use a polyester resin, a polyacrylic resin or a mixture thereof.

In a case where the carboxyl group-containing resin to be used in the present invention is a polyester, an optional polyester resin for coatings obtained by using a known acid material and alcohol material by a known method may be used so long as it satisfies the above-mentioned essentialities. In such a case, examples of the acid material to be used include phthalic acid, isophthalic acid, terephthalic acid, methylphthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, biphenyldicarboxylic acid, naphthyldicarboxylic acid, and reactive derivatives thereof such as acid anhydrides, acid halides and acid esters. They may be used alone or in combination as a mixture. Further, examples of the alcohol material to be used include ethylene glycol, propylene glycol, 1,3-butanediol, 1,4-butanediol, 1,6-hexanediol, diethylene glycol, dipropylene glycol, 1,4-cyclohexane dimethanol, 1,4-cyclohexanediol, biphenyldiol, naphthyldiol, neopentyl glycol, isopentyl glycol, bishydroxyethyl terephthalate, hydrogenated bisphenol A, alkylene oxide addition products of hydrogenated bisphenol A, trimethylolethane, trimethylolpropane, glycerol and pentaerythritol. They may be used alone or in combination as a mixture. Further, as the material for a polyester resin, a reactive multifunctional compound such as trimethylolpropane or dimethylol propionic acid, grease or a fatty acid may, for example, be used together as the case requires. Examples of the above-mentioned reactive polyfunctional compound include compounds having an acid radical and a hydroxyl group in one molecule, such as hydroxypivalic acid and hydroxybenzoic acid. The above-mentioned grease may be introduced by an ester exchange reaction, and the above-mentioned fatty acid may be introduced by e.g. a dehydration reaction, respectively.

The polymerization reaction of an ester may be carried out by a known single-step or multi-step reaction. The glass transition temperature value is controlled by selecting the type and amount of the reaction material, and the number average molecular weight and the acid value are controlled by selecting reaction conditions, as is generally known.

Further, with respect to the above-mentioned polyacrylic resin, as a material which provides a carboxyl group, acrylic acid and methacrylic acid are mentioned, and they may be used alone or in combination as a mixture. Further, with said acrylic acid or methacrylic acid, an unsaturated compound may be copolymerized. Said unsaturated compound may be an acrylic ester, a methacrylic ester or a monomer having an ethylene type unsaturated bond. Examples of which include e.g. methyl, ethyl, propyl, butyl, hexyl, octylbenzyl, dodecyl, lauryl, phenyl and hydroxylethyl esters of an acrylic acid or methacrylic acid, dialkyl esters such as diethyl ester and dibutyl ester of fumaric acid, dialkyl esters such as diethyl ester and dibutyl ester of itaconic acid, monomers such as acrylonitrile, acrylamide, styrene and vinyltoluene, and monomers for crosslinker such as diallylphthalate and diallyl ether. They may be used alone or in combination as a mixture of two or more of them. The polymerization reaction of the acrylic resin may be carried out by a known polymerization reaction, and the polymerization may be carried out in a solvent or in water. Further, the glass transition temperature value is controlled by selecting the type and amount of the reaction material, and the number average molecular weight and the acid value are controlled by selecting the reaction conditions, as is generally known.

The poly-β-methylglycidyl compound having at least two structures represented by the formula (1) in one molecular, to be used in the present invention as (B), is preferably β-methylglycidylamide or β-methylglycidyl ester. The β-methylglycidylamide may, for example, be tris(β-methylglycidyl)isocyanurate, and the β-methylglycidyl ester may, for example, be bis(β-methylglycidyl)terephthalate or tris(β-methylglycidyl)trimellitate. The above-mentioned component (B) is preferably bis(β-methylglycidyl) terephthalate, tris(β-methylglycidyl)trimellitate or tris(β-methylglycidyl)isocyanurate. With respect to such compounds, their synthesis method is not particularly limited, and they may be synthesized by a known method. For example, tris(β-methylglycidyl)isocyanurate may be synthesized from isocyanuric acid and a β-methyl epihalogenohydrin in accordance with the following reaction formula, provided that X is a halogen atom such as a chlorine atom or a bromine atom.

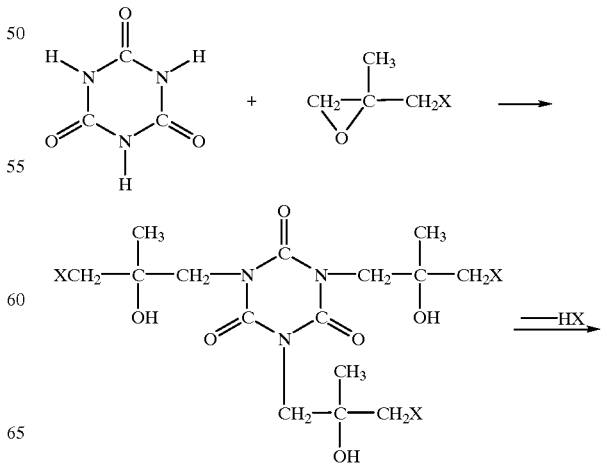

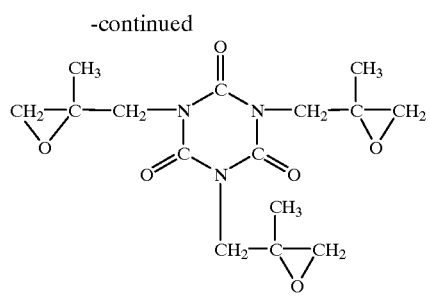

X: halogen atom

Tris(β-methylglycidyl) isocyanurate

Further, polyβ-methylglycidyl ester may be obtained in the same manner from a β-methyl epihalogenohydrin and a carboxylic acid corresponding thereto. For example, bis(β-methylglycidyl)terephthalate may be synthesized from a β-methyl epihalogenohydrin and terephthalic acid.

The amount of tris(β-methylglycidyl)isocyanurate is preferably such that the ratio of the equivalent amount of the total β-methylglycidyl groups including β-methylglycidyl groups in the above-mentioned by-product to the equivalent amount of the carboxyl groups in the component (A) is from 1.1 to 2.5, preferably from 1.3 to 2.0, most preferably from 1.4 to 2.0.

The component (C) to be used in the present invention is a sterically-hindered amine. The component (C) works as a heat yellowing inhibitor in the resin composition for powdery coatings of the present invention. As the sterically-hindered amine, preferred is a compound having a structure having at least one 2,2,6,6-tetramethylpiperidine derivative represented by the formula (2) in its molecule.

Examples of the compound represented by the above-mentioned formula (2) include phenyl-2,2,6,6-tetramethyl-4-piperidinyl carbonate, bis-(2,2,6,6-tetramethyl-4-piperidinyl)sebacate, bis-(N-methyl-2,2,6,6-tetramethyl-4-piperidinyl)sebacate, tetrakis(2,2,6,6-tetramethyl-4-piperidinyl)-1,2,3,4-butanetetracarboxylate, 4-hydroxy-2,2,6,6-tetramethyl-1-piperidine ethanol dimethylsuccinate polymer, poly((6-(1,1,3,3-tetramethylbutyl)imino-1,3,5-triazin-2,4,-diyl)((2,2,6,6-tetramethyl-4-piperidinyl)imino)hexamethylene((2,2,6,6-tetramethyl-4-piperidinyl)iminol, a (2,2,6,6-tetramethyl-4-piperidinyl/tridecyl)-1,2,3,4-butanetetracarboxylate mixture, a (1,2,2,6,6-pentamethyl)-4-piperidinyl/tridecyl)-1,2,3,4-butanetetracarboxylate mixture, a (2,2,6,6-tetramethyl-4-piperidinyl/β,β,β',β-tetramethyl-3,9-(2,4,8,10-tetraoxaspiro(5,5)undecane) diethyl)-1,2,3,4-butanetetracarboxylate mixture, and a (1,2,2,6,6-pentamethyl-4-piperidinyl/β,β,β',β'-tetramethyl-3,9-(2,4,8,10-tetraoxaspiro(5,5)undecane)diethyl)-1,2,3,4-butanetetracarboxylate mixture.

Further, in the present invention, as the component (C), 1,1'-(ethanediyl)-bis-(3,3,5,5-tetramethylpiperazinone) as one type of sterically-hindered amines may be used, although it does not have the structure of the formula (2).

In the composition of the present invention, the component (C) is incorporated in a proportion of preferably from 0.01 to 10 parts by weight based on 100 parts by weight of the component (A).

In a case where tris(β-methylglycidyl)isocyanurate or bis(β-methylglycidyl)terephthalate is used as a curing agent for the carboxyl group-containing resin for said composition, self-polymerization is likely to take place due to ring-opening polymerization between β-methylglycidyl groups during the curing under heating on a substrate, and accordingly, the desired curing reaction by the reaction of the carboxyl groups with β-methylglycidyl groups is hardly take place. As a result, the curing tends to be insufficient, whereby the obtained coating film may have no adequate physical properties such as the impact resistance and the weather resistance in some cases. In the present invention, a ring-opening polymerization inhibitor may be added as a component (D) so as to inhibit the ring-opening polymerization between the β-methylglycidyl groups.

The component (D) to be used in the present invention is at least one compound selected from the group consisting of an amine and an onium salt having a linkage represented by the formula (3) in its molecule:

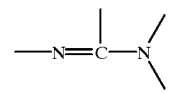

Formula (3)

The component (D) works as a ring-opening polymerization inhibitor in the resin composition for powdery coatings of the present invention.

As the amine as the above component (D) having the linkage represented by the formula (3) in its molecule, a chain structure or a cyclic structure may be mentioned, however, an amine having a cyclic structure is more preferred. Examples of the cyclic amine having the linkage represented by the formula (3) in its molecule include imidazole and an imidazole derivative, and the cyclic amine preferably has a structure represented by the formula (4):

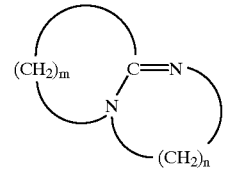

Formula (4)

wherein m is a natural number of from 2 to 11, and n is a natural number of from 2 to 3. By employing such a bicyclic structure, the water resistance will improve when the powdery resin composition is cured. Examples of the amine having the structure of the above-mentioned formula (4) include 1,8-diaza-bicyclo(5,4,0)undecene-7 and 1,5-diaza-bicyclo(4,3,0)nonene-5.

1,8-Diaza-bicyclo(5,4,0)undecene-7 is a compound represented by the following formula (13):

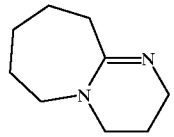

Formula (13)

1,5-diaza-bicyclo(4,3,0)nonene-5 is a compound represented by the following formula (14):

Formula (14)

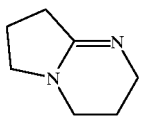

Examples of the onium salt as the above-mentioned component (D) include an ammonium salt, a phosphonium salt, an arsonium salt, a stibonium salt, an oxonium salt, a sulfonium salt, a selenonium salt, a stannonium salt and an iodonium salt. Further, the onium salt as the component (D) is preferably a quaternary ammonium salt having a structure represented by the formula (5):

Formula (5)

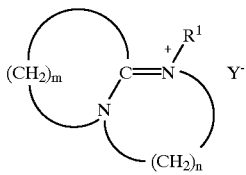

wherein m is a natural number of from 2 to 11, n is a natural number of from 2 to 3, $R^1$ is an alkyl group or an aryl group, and $Y^-$ is an anion; a quaternary ammonium salt having a structure represented by the formula (6): $R^2R^3R^4R^5N^+Y^-$ (wherein each of $R^2$, $R^3$, $R^4$ and $R^5$ is an alkyl group or an aryl group, N is a nitrogen atom, $Y^-$ is an anion, and each of $R^2$, $R^3$, $R^4$ and $R^5$ is bonded to the nitrogen atom by the C—N linkage); a quaternary ammonium salt having a structure of the formula (7);

Formula (7)

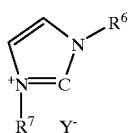

wherein each of $R^6$ and $R^7$ is an alkyl group or an aryl group, and $Y^-$ is an anion; a quaternary ammonium salt having a structure of the formula (8):

Formula (8)

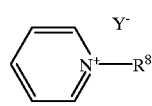

wherein $R^8$ is an alkyl group or an aryl group, and $Y^-$ is an anion; a quaternary ammonium salt having a structure of the formula (9):

Formula (9)

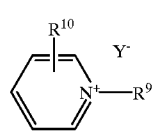

wherein each of $R^9$ and $R^{10}$ is an alkyl group or an aryl group, and $Y^-$ is an anion; a tertiary ammonium salt having a structure of the formula (10):

Formula (10)

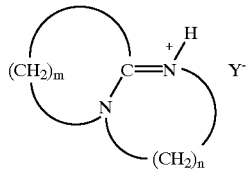

wherein m is a natural number of from 2 to 11, n is a natural of from 2 to 3, H is a hydrogen atom, and $Y^-$ is an anion; a quaternary phosphonium salt represented by the formula (11): $R^{11}R^{12}R^{13}R^{14}P^+Y^-$ (wherein each of $R^{11}$, $R^{12}$, $R^{13}$ and $R^{14}$ is an alkyl group or an aryl group, P is a phosphorus atom, $Y^-$ is an anion, and each of $R^{11}$, $R^{12}$, $R^{13}$ and $R^{14}$ is bonded to the phosphorus atom by the C—P linkage), or a tertiary sulfonium salt having a structure represented by the formula (12): $R^{15}R^{16}R^{17}S^+Y^-$ (wherein each of $R^{15}$, $R^{16}$ and $R^{17}$ is an alkyl group or an aryl group, $Y^-$ is an anion, and each of $R^{15}$, $R^{16}$ and $R^{17}$ is bonded to the sulfur atom by the C—S linkage).

It is preferred to select such an onium salt, from the viewpoint of effect to prevent the change of color of the cured product at a high temperature when used together with the component (C), as well as the effect to prevent the ring-opening polymerization.

The compound of the above-mentioned formula (5) is a quaternary ammonium salt derived from the amine of the formula (4), and m is a natural number of from 2 to 11, and n is a natural number of from 2 to 3. Particularly preferred is a quaternary ammonium salt derived from the amine of the formula (13) or (14). $R^1$ in said quaternary ammonium salt is a $C_{1-18}$, preferably $C_{2-10}$, alkyl or aryl group, and examples of which include linear alkyl groups such as an ethyl group, a propyl group and a butyl group, a benzyl group, a cyclohexyl group, a cyclohexylmethyl group and a dicyclopentadienyl group. Further, as the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to increase the water resistance of the cured product and to prevent change of color of the cured product at a high temperature. The compound of the above-mentioned formula (5) may be available as a commercial product, or it may be produced, for example, by a reaction of the compound of the formula (13) or (14) with a halogenated alkyl or halogenated aryl such as butyl bromide or benzyl chloride.

The compound of the above-mentioned formula (6) is a quaternary ammonium salt represented by $R^2R^3R^4R^5N^+Y^-$. In this quaternary ammonium salt, each of $R^2$, $R^3$, $R^4$ and $R^5$ is a $C_{1-18}$ alkyl group or aryl group, and in order to increase the water resistance the carbon numbers of $R^2$ to $R^5$ is preferably at least 9, and more preferably, at least one alkyl group or aryl group among $R^2$, $R^3$, $R^4$ and $R^5$ has a carbon number of from 6 to 18, in order to further increase the water resistance. As the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to increase the water resistance of the cured product and to prevent the change of color of the cured product at a high temperature. The quaternary ammonium salt of the formula (6) may be available as a commercial product, and examples of which include triethylbenzylammonium chloride, triethylbenzylammonium bromide, trioctylmethylammonium chloride, tributylbenzylammonium chloride and trimethylbenzylammonium chloride.

The compound of the above-mentioned formula (7) is a quaternary ammonium salt derived from a 1-substituted imidazole, each of $R^6$ and $R^7$ has a carbon number of from 1 to 18, and the total of the carbon numbers of $R^6$ and $R^7$ is preferably at least 7. $R^6$ may, for example, be a methyl group, an ethyl group, a propyl group, a phenyl group or a benzyl group, and $R^7$ may, for example, be a benzyl group, an octyl group or an octadecyl group. As the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to improve the water resistance of the cured product and to prevent the change of color of the cured product at a high temperature. This compound of the formula (7) may be available as a commercial product, or it may be produced, for example, by reacting an imidazole type compound such as 1-methylimidazole or 1-benzylimidazole with a halogenated alkyl or a halogenated aryl such as benzyl bromide or methyl bromide.

The compound of the above-mentioned formula (8) is a quaternary ammonium salt derived from pyridine, and $R^8$ is a $C_{1-18}$, preferably $C_{4-18}$, alkyl or aryl group, and examples of which include a butyl group, an octyl group, a benzyl group and a lauryl group. As the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to increase the water resistance of the cured product and to prevent the change of color of the cured product at a high temperature. This compound of the formula (8) may be available as a commercial product, or it may be produced, for example, by reacting pyridine with a halogenated alkyl or a halogenated aryl such as lauryl chloride, benzyl chloride, benzyl bromide, methyl bromide or octyl bromide. This compound of the formula (8) may, for example, be N-laurylpyridinium chloride or N-benzylpyridinium bromide.

The compound of the above-mentioned formula (9) is a quaternary ammonium salt derived from a substituted pyridine represented by e.g. picoline, and $R^9$ is a $C_{1-18}$, preferably $C_{4-18}$, alkyl group or aryl group, and examples of which include a methyl group, an octyl group, a lauryl group and a benzyl group. $R^{10}$ is a $C_{1-18}$ alkyl group or aryl group, and in the case of the quaternary ammonium derived from picoline, $R^{10}$ is a methyl group. As the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to increase the water resistance of the cured product and to prevent the change of color of the cured product at a high temperature. This compound of the formula (9) may be available as a commercial product, or it may be produced, for example, by reacting a substituted pyridine such as picoline with a halogenated alkyl or a halogenated aryl such as methyl bromide, octyl bromide, lauryl chloride, benzyl chloride or benzyl bromide. As this compound of the formula (9), N-benzylpicolinium chloride, N-benzylpicolinium bromide or N-laurylpicolinium chloride may, for example, be mentioned.

The compound of the above-mentioned formula (10) is a tertiary ammonium salt derived from the amine of the formula (4), m is a natural number of from 2 to 11, and n is a natural number of from 2 to 3. Particularly preferred is a tertiary ammonium salt derived from the amine of the formula (13) or (14). Further, as the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. The compound of the above-mentioned formula (10) may be available as a commercial product, or it may be produced, for example, by a reaction of the compound of the formula (13) or (14) with a weak acid such as a carboxylic acid or phenol. As the carboxylic acid, formic acid or acetic acid may be mentioned, and the anion ($Y^-$) is ($HCOO^-$) in the case of using formic acid, and the anion ($Y^-$) is ($CH_3COO^-$) in the case of using acetic acid. Further, the anion ($Y^-$) is ($C_6H_5O^-$) in the case of using phenol.

The compound of the above-mentioned formula (11) is a quaternary phosphonium salt having a structure of $R_{11}R^{12}R^{13}R^{14}P^+Y^-$. Each of $R^{11}$, $R^{12}$, $R^{13}$ and $R^{14}$ is a $C_{1-18}$ alkyl group or aryl group. Preferably, three of the four substituents $R_{11}$ to $R^{14}$ are a phenyl group or a substituted phenyl group, such as a phenyl group or a tolyl group, and the other one is a $C_{1-18}$ alkyl group or aryl group. Further, as the anion ($Y^-$), a halogen ion such as a chlorine ion ($Cl^-$), a bromine ion ($Br^-$) or an iodine ion ($I^-$), or an acid radical such as carboxylate (—$COO^-$), sulfonate (—$SO_3^-$) or alcoholate (—$O^-$), may, for example, be mentioned. However, a compound having chlorine ions and bromine ions as counter ions is preferred from the viewpoint of effects to increase the water resistance of the cured product and to prevent the change of color of the cured product at a high temperature. This compound of the formula (11) may be available as a commercial product, and examples of which include tetraalkylphosphonium halide such as tetra n-butylphosphonium halide and tetra n-propylphosphonium halide, trialkylbenzylphosphonium halide such as triethylbenzylphosphonium halide, triphenyl monoalkylphosphonium halide such as triphenylmethylphosphonium halide and triphenylethylphosphonium halide, triphenylbenzylphosphonium halide, tetraphenylphosphonium halide, tritolylmonoarylphosphonium halide and tritolylmonoalkylphosphonium halide (wherein the halogen atom is a chlorine atom or a bromine atom). Particularly preferred are triphenylmonoalkylphosphonium halide such as triphenylmethylphosphonium halide and triphenylethylphosphonium halide, triphenylmonoarylphosphonium halide such as triphenylbenzylphosphonium halide, tritolylmonoarylphosphonium halide such as tritolylmonophenylphosphonium halide, and tritolylmonoalkylphosphonium halide such as tritolylmonomethylphosphonium halide (wherein the halogen atom is a chlorine atom or a bromine atom). They are particularly preferred from the viewpoint of effect to prevent the change of color of the cured product at a high temperature.

The compound of the above-mentioned formula (12) is a tertiary sulfonium salt having a structure represented by $R^{15}R^{16}R^{17}S^+Y^-$ Each of $R^{15}$ $R^{16}$ and $R^{17}$ is a $C_{1-18}$ alkyl group or aryl group. Further, as the anion ($Y^-$), a halogen ion such as a chlorine ion ($Cl^-$), a bromine ion ($Br^-$) or an iodine ion ($I^-$), or an acid radical such as carboxylate ($—COO^-$), sulfonate ($—SO_3^-$) or alcoholate ($—O^-$), may, for example, be mentioned. However, a compound having chlorine ions and bromine ions as counter ions is preferred from the viewpoint of effects to increase the water resistance of the cured product and to prevent the change of color of the cured product at a high temperature. This compound of the formula (12) may be available as a commercial product, and examples of which include triphenylsulfonium chloride, triphenylsulfonium bromide and tritolylsulfonium chloride.

The component (D) to be used in the present invention is preferably at least one onium salt selected from the group consisting of the above-mentioned compound of the formula (5), the compound of the formula (7), the compound of the formula (8), the compound of the formula (9), the compound of the formula (10), the compound of the formula (11), and the compound of the formula (12). It is preferred to use such an onium salt for the resin composition for powdery coatings, since the self-polymerization due to ring-opening polymerization between the β-methylglycidyl groups can be inhibited (effect to inhibit the ring-opening polymerization), no change of color of the coating film tends to result after the curing by the combination with the component (C), and the water resistance will further improve.

Particularly, the component (D) to be used in the present invention is more preferably the above-mentioned compound of the formula (8), the compound of the formula (9), the compound of the formula (11), the compound of the formula (12), or a mixture thereof, from the viewpoint of the above-mentioned effects.

Most preferably, the component (D) to be used in the present invention is a triphenylmonoalkylphosphonium halide, a triphenylmonoarylphosphonium halide or a mixture thereof (provided that the halogen atom is a chlorine atom or a bromine atom). Such an onium salt will further increase the water resistance of the coating film obtained by curing the resin composition for powdery coatings, and has the most excellent effect to prevent the change of color.

As the method of adding a ring-opening polymerization inhibitor to be used as the component (D) in the present invention in a predetermined amount by a known method in production of a powdery coating, a first method of melt-mixing the component (D) with the carboxyl group-containing resin as the component (A), the curing agent as the component (B) and the component (C), and a pigment or another additive as the case requires, or a second method of preliminarily incorporating the component (D) into the carboxyl group-containing resin as the component (A), and melt-mixing the component (B), the component (C) and another component therewith. In said second method, a dicarboxylic acid component and a glycol component as the materials for the component (A), a modification component and a polymerization catalyst are charged in a reaction container, and at the same time, the ring-opening polymerization inhibitor as the component (D) is added thereto to produce a polyester resin in the presence of the component (D). In the second method, in a case of using, for example, triphenylbenzylphosphonium bromide as the component (D), triphenylphosphine and benzylbromide may be added in polymerization of the resin as the component (A) to synthesize triphenylbenzylphosphonium bromide simultaneously with the polymerization of the resin. Further, a functional group having an effect to inhibit the ring-opening polymerization may be incorporated in the structure of the resin. Further, in the above-mentioned second method, with respect to the compound represented by the formula (10), it is possible to incorporate the compound of the formula (10), into the component (A) by preliminarily melt-mixing the compound represented by the formula (13) or (14) with the carboxyl group-containing resin as the component (A) so that the component (A) react with the compound of the formula (13) or (14) to synthesize the compound represented by the formula (10). However, the compound of the formula (10) synthesized from the compound of the formula (13) or (14) in the component (A) will dissociate into the compound of the formula (13) or (14) in part by heat during melting.

In the present invention, an additive for powdery coatings may be added if necessary. Examples of this optional component include acrylic acid alkyl esters as a smoothness-improving agent for coating films, titanium dioxide as a coloring pigment, inorganic pigments such as iron oxide, organic pigments such as carbon, phthalocyanine and diazo compounds, and in addition, skim inhibitors, antistatic agents, flame retardants, plasticizers, flow control agents, ultraviolet light absorbers and antioxidants. Further, a known accelerator which accelerates the curing reaction of glycidyl groups and carboxyl groups may be contained. However, an acid catalyst such as a Lewis acid, for example boron trifluoride or the like, is unfavorable since it will accelerate the self-polymerization, not the curing reaction to be occurred originally.

Preparation of the resin composition for powdery coatings of the present invention may be carried out by a known method. For example, it is obtained in such a manner that the component (A), the component (B) and the component (C), and the ring-opening polymerization inhibitor (D) or an optional component as the case requires, are mixed, followed by melt-kneading at a temperature of from 70 to 120° C., preferably at least 70° C. and less than 100° C., and after the kneaded product is cooled, it is pulverized, followed by screening. The above-mentioned melt-kneading may be carried out by a conventional monoaxial or biaxial extrusion molding machine, such as a Ko-kneader molding machine manufactured by Bush. Further, the pulverization may be carried out by using a conventional dry pulverizer such as a hammer mill or a jet mill. The obtained pulverized product may be screened by a classifier of 50–200 mesh, preferably 100–200 mesh, to obtain the resin composition for powdery coating of the present invention in the form of a powder.

The resin composition for powdery coatings of the present invention may be used for a substrate of e.g. aluminum, alumite or iron, having a conventional conversion treatment applied thereto.

The resin composition for powdery coatings of the present invention is adhered to the substrate by a common electrostatic powder coating method or fluidized-bed coating method, followed by heating at a temperature of from 140 to 230° C. for from 10 minutes to 30 minutes for curing to obtain a coating film having adequate impact resistance, weather resistance, etc. The above-mentioned heating may be carried out by a conventional apparatus such as a circulating hot air stove, whereby a film having a thickness of from 30 to 300 μm may be formed on the substrate.

With respect to the carboxyl group-containing resin as the component (A) to be used in the present invention, if the number average molecular weight is less than 1000, the film strength tends to be low when a coating film is obtained, and if it exceeds 20000, the flowability tends to be low in baking, and accordingly no smooth coating film tends to be obtained. If the acid value is less than 5, as the carboxyl group content is low, no adequate reaction with the curing agent tends to occur, whereby the hardenability tends to be low, and no adequate coating film strength tends to be obtained. Further, if the acid value exceeds 200, the crosslink density tends to be high more than requires, and the impact resistance tends to be low. If the glass transition temperature is at most 30° C., the fusion (blocking) is likely to take place during storage, and if it exceeds 120° C., it tends to be difficult to uniformly mix with the curing agent in kneading, and the flowability tends to be low in baking, and accordingly no smooth coating film tends to be obtained.

As the resin containing a carboxyl group as the component (A), it is preferred to use a polyester resin, a polyacrylic resin or a mixture thereof.

The powdery coating having as a curing agent the poly-β-methylglycidyl compound as the curing agent component (B) to be used in the present invention provides a cured coating film having an excellent weather resistance as compared with glycidyl isocyanurate, since the methyl group located at the β-position of the β-methylglycidyl group is electron donative, and thus e.g. the hydrolytic resistance will increase due to a synergistic effect with a steric effect.

In the present invention, the amount of the component (C) is from 0.01 to 10 parts by weight based on 100 parts by weight of the component (A). If the amount is less than 0.01 part by weight, it will show no adequate effect as the heat yellowing inhibitor, and if it exceeds 10 parts by weight, said heat yellowing inhibitor will show such an action as accelerates the curing, whereby the gel time will be shortened, and the flowability tends to be poor during curing, and accordingly, a smooth coating film may not be obtained in some cases, such being unfavorable.

Now, Examples of the present invention will be explained below.

The following materials were prepared.

A1: Carboxyl group-containing polyester resin [manufactured by DSM, tradename P-2400, carboxy equivalent: 1840 g/eq, acid value: 30.5 (KOH-mg/g), glass transition temperature: about 63° C.]

A2: Carboxyl group-containing polyester resin [manufactured by UCB, tradename Crylcoat 801, carboxy equivalent: 1650 g/eq, acid value: 35.0 (KOH-mg/g), glass transition temperature: about 71° C.]

B1: Tris(β-methylglycidyl)isocyanurate [epoxy equivalent: 124 g/eq]

B2: Bis(β-methylglycidyl)terephthalate [epoxy equivalent: 163 g/eq]

B3: Triglycidyl isocyanurate [manufactured by Nissan Chemical Industries, Ltd., tradename: TEPIC, epoxy equivalent: 105 g/eq]

B4: Diglycidyl terephthalate [epoxy equivalent: 154 g/eq]

C1: Bis-(2,2,6,6-tetramethyl-4-piperidinyl)sebacate [manufactured by Ciba Speciality Chemicals K.K., tradename: Tinuvin 770]

C2: Bis-(N-methyl-2,2,6,6-tetramethyl-4-piperidinyl) sebacate [manufactured by Ciba Speciality Chemicals K.K., tradename: Tinuvin 765]

C3: Tetrakis(2,2,6,6-tetramethyl-4-piperidinyl)-1,2,3,4-butanetetracarboxylate [manufactured by Adeka Argus Chemical K.K., tradename: MARK LA-57]

C4: (2,2,6,6-tetramethyl-4-piperidinyl/β,β,β',β'-tetramethyl-3,9-(2,4,8,10-tetraoxaspiro(5,5)undecane) diethyl)-1,2,3,4-butanetetracarboxylate mixture [manufactured by Adeka Argus Chemical K.K. tradename: MARK LA-68]

C5: 4-Hydroxy-2,2,6,6-tetramethyl-1-piperidineethanol dimethyl succinate ester polymer [manufactured by Ciba Speciality Chemicals K.K., tradename: Tinuvin 622LD]

C6: Tributylamine [commercially available reagent]

C7: Piperidine [commercially available reagent]

C8: Tetrakis-(methylene-3-(3',5'-di-tert-butyl-4'-hydroxyphenyl)propionate)-methane [manufactured by Ciba Speciality Chemicals K.K., tradename: IRGANOX1010]

C9: Tris(2,4,-di-tert-butylphenyl)phosphite [manufactured by Ciba Speciality Chemicals K.K., tradename: IRGAFOS168]

D1: Benzyltriphenylphosphonium bromide [manufactured by San-Apro Ltd., tradename: SA5003]

E1: Flow modifier [manufactured by Monsanto Chemical, tradename: Modaflow P-3]

F1: Skim inhibitor [manufactured by Wako Pure Chemical Industries, Ltd., tradename: Benzoin]

G1: White pigment (main component: titanium oxide) [manufactured by Kronos Titan GMBH, tradename: Clonos2160]

Among the above-mentioned components C1 to C9, the components C1 to C5 are sterically-hindered amines, the components C6 to C7 are amines having no steric hindrance, the component C8 is a sterically-hindered phenol, and the component C9 is a phosphorus type antioxidant.

Synthesis of tris(β-methylglycidyl)isocyanurate B1

To a flask having a capacity of 3 l, equipped with a stirring apparatus, a thermometer, a continuous dropping apparatus and an apparatus which concentrates azeotropic vapor of β-methylepichlorohydrin and water under reduced pressure, and returns β-methylepichlorohydrin alone to the reaction system, 129 g (1 mol) of isocyanuric acid, 2100 g (20 mol) of β-methylepichlorohydrin and 3 g of tetramethylammonium chloride were added, followed by stirring at 120° C. for 10 hours. Then, the pressure in the reaction system was reduced to 50 mmHg, and the total of 320 g (4 mol) of an aqueous sodium hydroxide solution having a concentration of 50 wt % was dropwise added over a period of about 3 hours for reaction, while keeping the temperature in the reaction container to be from 40 to 50° C. During this reaction, water added dropwise and water formed were removed to outside of the system by azeotropy with β-methylepichlorohydrin.

After the reaction, the inside of the reaction container was cooled to room temperature, and sodium hydroxide used in an excessive amount was neutralized by washing by using a 10 wt % aqueous sodium dihydrogen phosphate solution. Then, salt was removed by washing with water, and β-methylepichlorohydrin was distilled off under reduced pressure (10 mmHg) at 120° C. to obtain 274 g of tris(β-methylglycidyl)isocyanurate. It had an epoxy equivalent of 124 g/eq, and was a white solid.

Synthesis of bis(β-methylglycidyl)terephthalate B2

To a flask having a capacity of 3 l, equipped with a stirring apparatus, a thermometer, a continuous dropping apparatus and an apparatus which concentrates azeotropic vapor of β-methylepichlorohydrin and water under reduced pressure, and returns β-methylepichlorohydrin alone to the reaction system, 166 g (1 mol) of terephthalic acid, 2100 g (20 mol) of β-methylepichlorohydrin and 3 g of tetramethylammonium chloride were added, followed by stirring at 120° C. for 10 hours. Then, the pressure in the reaction system was reduced to 50 mmHg, and the total of 320 g (4 mol) of an aqueous sodium hydroxide solution having a concentration of 50 wt % was dropwise added over a period of about 3 hours for reaction, while keeping the temperature in the reaction container to be from 40 to 50° C. During this reaction, water added dropwise and water formed were removed to outside of the system by azeotropy with β-methylepichlorohydrin.

After the reaction, the inside of the reaction container was cooled to room temperature, and sodium hydroxide used in an excessive amount was neutralized by washing by using a 10 wt % aqueous sodium dihydrogen phosphate solution. Then, salt was removed by washing with water, and β-methylepichlorohydrin was distilled off under reduced pressure (10 mmHg) at 120° C. to obtain 274 g of bis(β-methylglycidyl)terephthalate. It had an epoxy equivalent of 163 g/eq, and was a white solid.

Synthesis of diglycidyl terephthalate B4

To a flask having a capacity of 3 l, equipped with a stirring apparatus, a thermometer, a continuous dropping apparatus and an apparatus which concentrates azeotropic vapor of epichlorohydrin and water under reduced pressure, and returns epichlorohydrin alone to the reaction system, 166 g (1 mol) of terephthalic acid, 1850 g (20 mol) of epichlorohydrin and 3 g of tetramethylammonium chloride were added, followed by stirring at 100° C. for 10 hours. Then, the pressure in the reaction system was reduced to 50 mmHg, and the total of 320 g (4 mol) of an aqueous sodium hydroxide solution having a concentration of 50 wt % was dropwise added over a period of about 3 hours for reaction, while keeping the temperature in the reaction container to be from 40 to 50° C. During this reaction, water added dropwise and water formed were removed to outside of the system by azeotropy with epichlorohydrin.

After the reaction, the inside of the reaction container was cooled to room temperature, and sodium hydroxide used in an excessive amount was neutralized by washing by using a 10 wt % aqueous sodium dihydrogen phosphate solution. Then, salt was removed by washing with water, and epichlorohydrin was distilled off under reduced pressure (10 mmHg) at 120° C. to obtain 236 g of diglycidyl terephthlate. It had an epoxy equivalent of 154 g/eq, and was a white solid.

EXAMPLE 1

576 g of a carboxyl group-containing polyester resin (A1), 58 g of tris(β-methylglycidyl)isocyanurate (B1), 1 g of bis(2,2,6,6-tetramethyl-4-piperidinyl)sebacate (C1), 3 g of benzyltriphenylphosphonium bromide (D1), 10.0 g of a flow modifier (E1), 3.0 g of a skim inhibitor (F1) and 350 g of a white pigment (G1) were put in a kneader, followed by melt-mixing at a temperature of 120° C. Then, the mixture was cooled to room temperature, and pulverized by using a mixer for domestic use. This pulverized product was screened by a classifier of 150 mesh, to obtain a resin composition for powdery coatings. The above blend composition is shown in Table 1.

EXAMPLES 2 to 8

Resin compositions for powdery coatings of Examples 2 to 8 were obtained in the same manner as in Example 1 with blend components as shown in Table 1.

COMPARATIVE EXAMPLE 1

576 g of a carboxyl group-containing polyester resin (A1), 58 g of tris(β-methylglycidyl)isocyanurate (B1), 3 g of benzyltriphenylphosphonium bromide (D1), 10.0 g of a flow modifier (E1), 3.0 g of a skim inhibitor (F1) and 350 g of a white pigment (G1) were put in a kneader, followed by melt-mixing at a temperature of 120° C. Then, the mixture was cooled to room temperature, and pulverized by using a mixer for domestic use. This pulverized product was screened by a classifier of 150 mesh, to obtain a resin composition for powdery coatings. The above blend composition is shown in Table 2.

COMPARATIVE EXAMPLES 2 to 8

A resin composition for powdery coatings of Comparative Example 2 was obtained in the same manner as in Comparative Example 1 with blend components as shown in Table 2.

TABLE 1

| Component | Ex. | | | | | | | |
|---|---|---|---|---|---|---|---|---|
| | 1 | 2 | 3 | 4 | 5 | 6 | 7 | 8 |
| A1 | 576 | 576 | 576 | 576 | 576 | 576 | 576 | — |
| A2 | — | — | — | — | — | — | — | 571 |
| B1 | 58 | 58 | 58 | 58 | 58 | 58 | 58 | — |
| B2 | — | — | — | — | — | — | — | 63 |
| B3 | — | — | — | — | — | — | — | — |
| B4 | — | — | — | — | — | — | — | — |
| C1 | 1 | 3 | 5 | — | — | — | — | 3 |
| C2 | — | — | — | 3 | — | — | — | — |
| C3 | — | — | — | — | 3 | — | — | — |
| C4 | — | — | — | — | — | 3 | — | — |
| C5 | — | — | — | — | — | — | 3 | — |
| C6 | — | — | — | — | — | — | — | — |
| C7 | — | — | — | — | — | — | — | — |
| C8 | — | — | — | — | — | — | — | — |
| C9 | — | — | — | — | — | — | — | — |
| D1 | 3 | 3 | 3 | 3 | 3 | 3 | 3 | 3 |
| E1 | 10 | 10 | 10 | 10 | 10 | 10 | 10 | 10 |
| F1 | 3 | 3 | 3 | 3 | 3 | 3 | 3 | 3 |
| G1 | 350 | 350 | 350 | 350 | 350 | 350 | 350 | 350 |

TABLE 2

| Component | Comparative Ex. | | | | | | | |
|---|---|---|---|---|---|---|---|---|
| | 1 | 2 | 3 | 4 | 5 | 6 | 7 | 8 |
| A1 | 576 | — | 576 | 576 | 576 | 576 | 592 | — |
| A2 | — | 571 | — | — | — | — | — | 579 |
| B1 | 58 | — | 58 | 58 | 58 | 58 | — | — |
| B2 | — | 63 | — | — | — | — | — | — |
| B3 | — | — | — | — | — | — | 45 | — |
| B4 | — | — | — | — | — | — | — | 58 |
| C1 | — | — | — | — | — | — | — | — |
| C2 | — | — | — | — | — | — | — | — |
| C3 | — | — | — | — | — | — | — | — |
| C4 | — | — | — | — | — | — | — | — |
| C5 | — | — | — | — | — | — | — | — |
| C6 | — | — | 3 | — | — | — | — | — |
| C7 | — | — | — | 3 | — | — | — | — |
| C8 | — | — | — | — | 3 | — | — | — |
| C9 | — | — | — | — | — | 3 | — | — |
| D1 | 3 | 3 | 3 | 3 | 3 | 3 | — | — |
| E1 | 10 | 10 | 10 | 10 | 10 | 10 | 10 | 10 |
| F1 | 3 | 3 | 3 | 3 | 3 | 3 | 3 | 3 |
| G1 | 350 | 350 | 350 | 350 | 350 | 350 | 350 | 350 |

A zinc phosphate-treated steel plate having a thickness of 0.6 mm was coated with each of the above-mentioned resin compositions for powdery coatings obtained in Examples 1 to 8 and Comparative Examples 1 to 8, with a film thickness of 60 μm by an electrostatic spray coating method, followed by baking at 180° C. for 20 minutes to obtain a coating film, which was used for the following evaluation tests (1) and (2).

Test (1): Impact test (In accordance with a test on impact resistance of general test method for coatings, JIS K-5400.) Between a firing pin having a certain roundness at its tip and a cradle having a concavity corresponding to said roundness, a test specimen was put so that the coating film faced upward, and the impact resistance of the coating film when the above-mentioned firing pin (bullet having a sphere contained therein) having a certain roundness hit the surface of the coating film, was examined on the basis of whether or not a cracking or peeling appeared. The intensity of the impact was adjusted by the weight of the falling body and the falling distance. The weight of the falling body and the falling distance when a crack or peeling appeared on the surface of the coating film were recorded. The size of the tip of the firing pin was unified to be half an inch, and the representation was made on the basis of (the weight of the bullet)×(the height). The impact machine was one manufactured by Toyo Tester K.K. In Tables 3 and 4, the case of passing the impact resistance test under conditions of 1 kg and 50 cm or severer, was represented by the symbol (○), and the case of fail was represented by (X)

Test (2): Weather resistance test (In accordance with ASTMG-53.) The test specimen was irradiated with UV rays having a wavelength λmax of 340 nm with an energy of 4.0 mW/cm² at 60° C. for 4 hours, and then the irradiation was terminated, followed by wetting at 50° C. for 4 hours. This cycle test was carried out for a long period of time, the 60° gloss was measured, and the time was recorded when the retention became 50% based on the initial gloss (gloss before the test). Evaluation was made based on said time, and the case where it was less than 2000 hours was rated as r(1), from 2000 hours to less than 2500 hours as r(2), from 2500 hours to less than 3000 hours as r(3), and at least 3000 hours as r(4). The weather resistance increases in order of from r(1) to r(4). The cycle test was carried out by using a Dew panel optical control weather meter manufactured by Suga Shikenkikai K.K., and the gloss was measured by a gloss meter manufactured by Tester Kogyo K.K.

Test (3): Evaluation of heat yellowing resistance

A zinc phosphate-treated steel plate having a thickness of 0.6 mm was coated with the resin composition for powdery coatings with a film thickness of 60 μm by an electrostatic spray coating method, followed by baking at 220° C. for 20 minutes, to obtain a coating film by the above-mentioned resin composition for powdery coatings. It was baked at 180° C. for 20 minutes to obtain a coating film sample, and the color difference (ΔE) was measured. ΔE was calculated from the following formulae by color measuring of L*, a* and b* in a color space as standardized by JIS-Z8729.

$$\Delta E = \sqrt{((\Delta L^*)^2 + (\Delta a^*)^2 + (\Delta b^*)^2)}$$

ΔL*: (L* of coating film baked at 180° C. for 20 minutes)–(L* of coating film baked at 220° C. for 20 minutes)

Δa*: (a* of coating film baked at 180° C. for 20 minutes)–(a* of coating film baked at 220° C. for 20 minutes)

Δb*: (b* of coating film baked at 180° C. for 20 minutes)–(b* of coating film baked at 220° C. for 20 minutes)

The color measuring of the color space was carried out by using an SM color computer, model SM-5-CH, manufactured by Suga Shikenkikai K.K. Test (4): Evaluation of NOX yellowing resistance A zinc phosphate-treated steel plate having a thickness of 0.6 mm was coated with the resin composition for powdery coatings with a film thickness of 60 μm by an electrostatic spray coating method, followed by baking at 180° C. for 20 minutes in an oven which had an inner size of 80×80×110 cm and in which the atmosphere was made to be of NOX by preliminarily putting 16.3 g of a 5% nitric acid 10 minutes before the baking, to obtain a coating film by the above-mentioned resin composition for powdery coatings. It was baked in a conventional oven in which the atmosphere was not of NOX, at 180° C. for 20 minutes, to obtain a coating film sample, and the color difference (ΔE) was measured. ΔE was calculated from the following formulae by color measuring of L*, a* and b* in a color space as standardized by JIS-Z8729.

$$\Delta E = \sqrt{((\Delta L^*)^2 + (\Delta a^*)^2 + (\Delta b^*)^2)}$$

ΔL*: (L* of the coating film baked at 180° C. for 20 Minutes)–(L* of the coating film baked at 180° C. for 20 minutes in an NOX atmosphere)

Δa*: (a* of the coating film baked at 180° C. for 20 Minutes)–(a* of the coating film baked at 180° C. for 20 minutes in an NOX atmosphere)

Δb*: (b* of the coating film baked at 180° C. for 20 Minutes)–(b* of the coating film baked at 180° C. for 20 minutes in an NOX atmosphere)

The color measuring of the color space was carried out by using an SM color computer, model SM-5-CH, manufactured by Suga Shikenkikai K.K.

The results of the above-mentioned evaluations are shown in Tables 3 and 4.

TABLE 3

| | Ex. | | | | | | | |
|---|---|---|---|---|---|---|---|---|
| Text No. | 1 | 2 | 3 | 4 | 5 | 6 | 7 | 8 |
| (1) | ○ | ○ | ○ | ○ | ○ | ○ | ○ | ○ |
| (2) | r(4) | r(4) | r(4) | r(4) | r(4) | r(4) | r(4) | r(4) |
| (3) | 0.9 | 0.6 | 0.5 | 0.6 | 0.6 | 0.8 | 0.6 | 0.9 |
| (4) | 2.2 | 2.2 | 1.8 | 2.3 | 2.1 | 2.2 | 2.2 | 1.5 |

TABLE 4

| | Comparative Ex. | | | | | | | |
|---|---|---|---|---|---|---|---|---|
| Text No. | 1 | 2 | 3 | 4 | 5 | 6 | 7 | 8 |
| (1) | ○ | ○ | ○ | ○ | ○ | ○ | ○ | ○ |
| (2) | r(4) | r(4) | r(4) | r(4) | r(4) | r(4) | r(3) | r(1) |
| (3) | 1.5 | 1.5 | 2.3 | 2.1 | 1.3 | 1.5 | 0.6 | 0.8 |
| (4) | 2.2 | 1.5 | 3.5 | 3.7 | 15.2 | 1.5 | 3.4 | 6.5 |

The composition of the present invention has an impact resistance and a weather resistance, and in addition, has substantially no change of color due to the change in temperature during curing under heating.

On the other hand, with respect to the composition containing a compound having a β-methylglycidyl group as described in Comparative Examples 1 and 2, as it contains no component (C), its color changes due to variation in temperature during curing under heating. The amines as described in Comparative Examples 3 and 4 are different from the component (C) and not a sterically-hindered amine, and accordingly, they not only have no effect to suppress the change of color, but may cause the change of color.

The antioxidant of sterically-hindered phenol type as shown in Comparative Example 5 has an effect to suppress the change of color to a degree, however, there is a problem of significant coloring by NOX as indicated in the test (4).

The antioxidant of phosphorus type as shown in Comparative Example 6 makes no difference as compared with the case containing no component (C).

Further, with respect to the compositions containing a compound having a glycidyl group as described in comparative examples 7 and 8, they do not require the component (C) in view of change of color, however, they are poor in weather resistance as compared with compositions containing a compound having a βmethylglycidyl group, as indicated in the test (2).

What is claimed is:

1. A resin composition for powdery coatings, which contains the following components (A), (B) and (C):
   (A) a carboxyl group-containing resin having a number average molecular weight of from 1000 to 20000, an acid value of from 5 to 200 and a glass transition temperature of from 30 to 120° C.,
   (B) a poly-β-methylglycidyl compound having at least two structures represented by the formula (1) in one molecule:

formula (1)

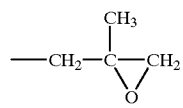

and
   (C) a sterically-hindered amine as a heat yellowing inhibitor.

2. The resin composition for powdery coatings according to claim 1, wherein the poly-β-methylglycidyl compound as the component (B) is β-methylglycidylamide or β-methylglycidyl ester.

3. The resin composition for powdery coatings according to claim 1, wherein the poly-β-methylglycidyl compound as the component (B) is bis(β-methylglycidyl)terephthalate, tris(β-methylglycidyl)trimellitate or tris(β-methylglycidyl) isocyanurate.

4. The resin composition for powdery coatings according to claim 1, wherein the sterically-hindered amine as the component (C) is a compound having a structure having at least one 2,2,6,6-tetramethyl piperidine derivative represented by the formula (2) in its molecule:

formula (2)

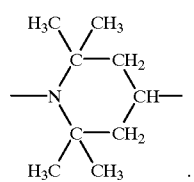

5. The resin composition for powdery coatings according to claim 1, wherein the component (A) and the component (B) are contained in an equivalent ratio of (β-methylglycidyl groups in the component (B)) to (carboxyl groups in the component (A)) of from 1.1 to 2.5.

6. The resin composition for powdery coatings according to claim 1, wherein the component (C) is contained in a proportion of from 0.01 to 10 parts by weight based on 100 parts by weight of the component (A).

7. The resin composition for powdery coatings according to claim 1, wherein the carboxyl group-containing resin as the component (A) is a polyester resin, a polyacrylic resin or a mixture thereof.

8. The resin composition for powdery coatings according to claim 2, wherein the sterically-hindered amine as the component (C) is a compound having a structure having at least one 2,2,6,6-tetramethyl piperidine derivative represented by the formula (2) in its molecule:

formula (2)

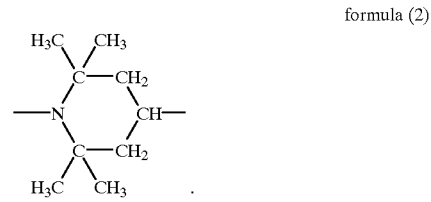

9. The resin composition for powdery coatings according to claim 2, wherein the component (A) and the component (B) are contained in an equivalent ratio of (β-methylglycidyl groups in the component (B)) to (carboxyl groups in the component (A)) of from 1.1 to 2.5.

10. The resin composition for powdery coatings according to claim 2, wherein the component (C) is contained in a proportion of from 0.01 to 10 parts by weight based on 100 parts by weight of the component (A).

11. The resin composition for powdery coatings according to claim 2, wherein the carboxyl group-containing resin as the component (A) is a polyester resin, a polyacrylic resin or a mixture thereof.

12. The resin composition for powdery coatings according to claim 9, wherein the sterically-hindered amine as the component (C) is a compound having a structure having at least one 2,2,6,6-tetramethyl piperidine derivative represented by the formula (2) in its molecule:

formula (2)

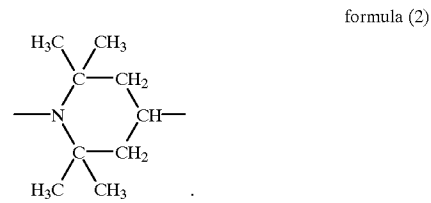

13. The resin composition for powdery coatings according to claim 9, wherein the component (C) is contained in a proportion of from 0.01 to 10 parts by weight based on 100 parts by weight of the component (A).

14. The resin composition for powdery coatings according to claim 9, wherein the carboxyl group-containing resin as the component (A) is a polyester resin, a polyacrylic resin or a mixture thereof.

15. The resin composition for powdery coatings according to claim 3, wherein the sterically-hindered amine as the component (C) is a compound having a structure having at least one 2,2,6,6-tetramethyl piperidine derivative represented by the formula (2) in its molecule:

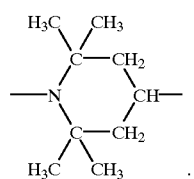

formula (2)

16. The resin composition for powdery coatings according to claim 15, wherein the component (A) and the component (B) are contained in an equivalent ratio of (β-methylglycidyl groups in the component (B)) to (carboxyl groups in the component (A)) of from 1.1 to 2.5.

17. The resin composition for powdery coatings according to claim 16, wherein the component (C) is contained in a proportion of from 0.01 to 10 parts by weight based on 100 parts by weight of the component (A).

18. The resin composition for powdery coatings according to claim 17, wherein the carboxyl group-containing resin as the component (A) is a polyester resin, a polyacrylic resin or a mixture thereof.

19. The resin composition for powdery coatings according to claim 18, wherein the component (C) is bis-(2,2,6,6-tetramethyl-4-piperidinyl)sebacate.

* * * * *